(12) United States Patent
Vilalta et al.

(10) Patent No.: US 6,842,751 B1
(45) Date of Patent: Jan. 11, 2005

(54) METHODS AND APPARATUS FOR SELECTING A DATA CLASSIFICATION MODEL USING META-LEARNING

(75) Inventors: Ricardo Vilalta, Stamford, CT (US); Irina Rish, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 09/629,086

(22) Filed: Jul. 31, 2000

(51) Int. Cl.[7] ............................................. G06F 17/30
(52) U.S. Cl. ..................... 707/6; 707/102.1; 707/104.1; 706/12; 706/14; 706/20
(58) Field of Search .............................. 707/1–10, 100, 707/101; 706/16, 15, 28, 30

(56) References Cited

U.S. PATENT DOCUMENTS

| | | | | |
|---|---|---|---|---|
| 5,465,321 A | * | 11/1995 | Smyth | 706/20 |
| 5,742,738 A | * | 4/1998 | Koza et al. | 706/13 |
| 5,835,901 A | * | 11/1998 | Duvoisin et al. | 706/19 |
| 5,884,294 A | * | 3/1999 | Kadar et al. | 706/10 |
| 5,970,482 A | * | 10/1999 | Pham et al. | 706/16 |
| 6,058,385 A | * | 5/2000 | Koza et al. | 706/13 |
| 6,301,579 B1 | * | 10/2001 | Becker | 707/102 |
| 6,356,884 B1 | * | 3/2002 | Thaler | 706/28 |
| 6,728,689 B1 | * | 4/2004 | Drissi et al. | 706/14 |

OTHER PUBLICATIONS

"Information Extraction as a Bisis for High–Precision Text Classification"—Ellen Riloff and Wendy Lehnert—ACM Tranaction on Information Systems, vol. 12, No. 3, Jul. 1994, (pps: 296–333).*

* cited by examiner

Primary Examiner—Jean M. Corrielus
Assistant Examiner—Anh Ly
(74) Attorney, Agent, or Firm—Ryan, Mason & Lewis, LLP; Louis J. Percello, Esq.

(57) ABSTRACT

A data classification method and apparatus are disclosed for labeling unknown objects. The disclosed data classification system employs a model selection technique that characterizes domains and identifies the degree of match between the domain meta-features and the learning bias of the algorithm under analysis. An improved concept variation meta-feature or an average weighted distance meta-feature, or both, are used to fully discriminate learning performance, as well as conventional meta-features. The "concept variation" meta-feature measures the amount of concept variation or the degree of lack of structure of a concept. The present invention extends conventional notions of concept variation to allow for numeric and categorical features, and estimates the variation of the whole example population through a training sample. The "average weighted distance" meta-feature of the present invention measures the density of the distribution in the training set. While the concept variation meta-feature is high for a training set comprised of only two examples having different class labels, the average weighted distance can distinguish between examples that are too far apart or too close to one other.

24 Claims, 9 Drawing Sheets

Performance Table 400

| | 450 | 455 |
|---|---|---|
| 405 | meta-features domain 1 | best model: algorithm x |
| 410 | meta-features domain 2 | best model: algorithm y |
| 415 | meta-features domain 3 | best model: algorithm z |

Performance Table

| 450 | 455 |
|---|---|
| meta-features domain 1 (405) | best model: algorithm x |
| meta-features domain 2 (410) | best model: algorithm y |
| meta-features domain 3 (415) | best model: algorithm z |

METHODS AND APPARATUS FOR SELECTING A DATA CLASSIFICATION MODEL USING META-LEARNING

FIELD OF THE INVENTION

The present invention relates generally to the fields of data mining or machine learning and, more particularly, to methods and apparatus for selecting a data classification model using meta-learning.

BACKGROUND OF THE INVENTION

Data classification techniques, often referred to as supervised learning, attempt to find an approximation or hypothesis to a target concept that assigns objects (such as processes or events) into different categories or classes. Data classification can normally be divided into two phases, namely, a learning phase and a testing phase. The learning phase applies a learning algorithm to training data. The training data is typically comprised of descriptions of objects (a set of feature variables) together with the correct classification for each object (the class variable).

The goal of the learning phase is to find correlations between object descriptions to learn how to classify the objects. The training data is used to construct models in which the class variable may be predicted in a record in which the feature variables are known but the class variable is unknown. Thus, the end result of the learning phase is a model or hypothesis (e.g., a set of rules) that can be used to predict the class of new objects. The testing phase uses the model derived in the training phase to predict the class of testing objects. The classifications made by the model is compared to the true object classes to estimate the accuracy of the model.

Numerous techniques are known for deriving the relationship between the feature variables and the class variables, including, for example, Disjunctive Normal Form (DNF) Rules, decision trees, nearest neighbor, support vector machines (SVMs) and Bayesian classifiers, as described, for example, in R. Agrawal et al., "An Interval Classifier for Database Mining Applications," Proc. of the 18th VLDB Conference, Vancouver, British Columbia, Canada 1992; C. Apte et al., "RAMP: Rules Abstraction for Modeling and Prediction," IBM Research Report RC 20271, June 1995; J. R. Quinlan, "Induction of Decision Trees," Machine Learning, Volume 1, Number 1, 1986; J. Shafer et al., "SPRINT: A Scaleable Parallel Classifier for Data Mining," Proc. of the 22d VLDB Conference, Bombay, India, 1996; M. Mehta et al., "SLIQ: A Fast Scaleable Classifier for Data Mining," Proceedings of the Fifth International Conference on Extending Database Technology, Avignon, France, March, 1996, each incorporated by reference herein.

Data classifiers have a number of applications that automate the labeling of unknown objects. For example, astronomers are interested in automated ways to classify objects within the millions of existing images mapping the universe (e.g., differentiate stars from galaxies). Learning algorithms have been trained to recognize these objects in the training phase, and used to predict new objects in astronomical images. This automated classification process obviates manual labeling of thousands of currently available astronomical images.

While data classification has been the subject of much study and data classifiers are a useful tool in real-world applications, the reasons why one algorithm may be more successful than others in giving good approximations to a target concept nevertheless remain elusive. When many algorithms are available for a specific classification task, it is hard to determine which algorithm will produce the best model for analysis. Thus, the area of model selection remains a difficult problem.

One approach to model selection seeks to trace a link between a learning algorithm and the domains on which this algorithm outperforms all other competitors. For a discussion of such approaches, see, for example, D. Michie, Machine Learning, Neural and Statistical Classification. Ellis Horwood 1994; S. M. Weiss, & C. A. Kulikowski, Computer Systems That Learn, Morgan Kaufmann Publishers, Inc. San Mateo, Calif. 1990 incorporated by reference herein. Other approaches include applying meta-learning techniques to find rules identifying the domains on which an algorithm attains high accuracy, and selecting the best of a set of classifiers as the best approximation to the target concept. Generally, such meta-learning techniques represent each domain as a vector of meta-features and attaches to each vector the best algorithm for that domain. See, for example, P. Brazdil et al., "Characterizing the Applicability of Classification Algorithms Using Meta Level Learning," European Conference on Machine Learning (ECML-94), 83–102 (1994), incorporated by reference herein. Generally, meta-learning techniques evaluate the best learning algorithm that has been identified for each domain and attempt to identify the best learning algorithm for a new domain. An alternate approach to model selection uses a voting scheme that classifies an object using various learning algorithms and classifies an object based on the class receiving the most votes among the various models. See, for example, L. Breiman, "Bagging Predictors", Machine Learning, 123–140 (1996).

While conventional model selection techniques perform satisfactorily for many applications, they suffer from a number of limitations, which if overcome, could greatly expand the utility and accuracy of data classifiers. Conventional model selection techniques, however, typically fail to recognize that a richer characterization of domains is necessary to produce theories that can explain accuracy performance. Such current model selection techniques are limited to (i) straightforward parameters, such as the number of examples, number of classes or number of features; (ii) statistical estimations, such as feature correlation or homogeneity of covariances; and (iii) information-theoretic measures, such as class entropy.

A need therefore exists for a model selection technique that considers additional meta-learning measures to make a distinction between concepts denoting regular patterns over the instance space that commonly lead to the discovery of concise representations, and concepts characterized by many irregularities which often lead to long representations. A proper characterization of concept complexity can explain accuracy performance by identifying the degree of match between the concept and the learning bias of the algorithm under analysis. A further need exists for a model selection technique that characterizes domains and identifies the degree of match between the domain meta-features and the learning bias of the algorithm under analysis. Yet another need exists for a model selection technique that accounts for features (e.g., meta-features) of a given domain.

SUMMARY OF THE INVENTION

Generally, a data classification method and apparatus are disclosed for labeling unknown objects. The disclosed data classification system employs a model selection technique that characterizes domains and identifies the degree of match between the domain meta-features and the learning bias of the algorithm under analysis.

The disclosed data classification system utilizes an improved concept variation meta-feature or an average weighted distance meta-feature, or both, as well as well-known conventional meta-features to fully discriminate learning performance. The "concept variation" meta-feature measures the amount of concept variation or the degree of lack of structure of a concept. Generally, concept variation measures the probability that any two neighbor examples differ in class value to quantify the amount of irregularity in the class-label distribution.

While conventional notions of the concept variation meta-feature were limited to Boolean features, the present invention allows for numeric and categorical features, and estimates the variation of the whole example population through a training sample. The conventional definition of concept variation assumes access to the closest neighbors of a given example. In real-world domains, however, that assumption is not valid. Thus, a distance metric is used to determine the contribution of each example to the amount of concept variation.

While the improved notion of concept variation estimates the variability of class labels among examples, it fails to capture how dense or sparse is the example distribution in the training set. The "average weighted distance" meta-feature of the present invention measures the density of the distribution in the training set. While the concept variation meta-feature is high for a training set comprised of only two examples having different class labels, the average weighted distance can distinguish between examples that are too far apart or too close to one other.

A more complete understanding of the present invention, as well as further features and advantages of the present invention, will be obtained by reference to the following detailed description and drawings.

DETAILED DESCRIPTION OF PREFERRED EMBODIMENTS

Figure 1:
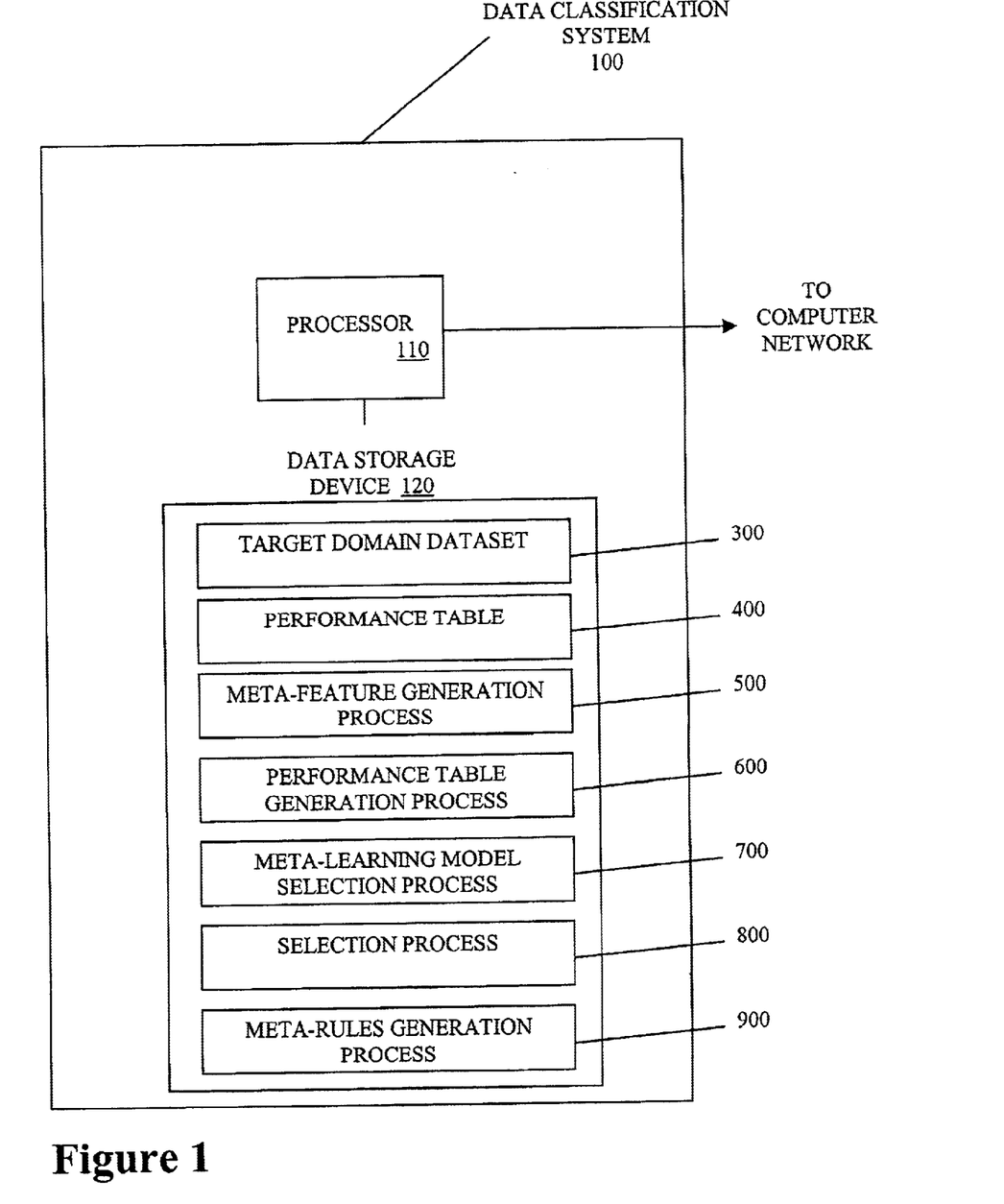
FIG. 1 is a schematic block diagram showing the architecture of an illustrative data classification system in accordance with the present invention.

FIG. 1 illustrates a data classification system 100 in accordance with the present invention. Generally, according to one feature of the present invention discussed further below, the data classification system 100 utilizes certain relevant meta-features to improve the task of model selection. In one implementation, the data classification system 100 utilizes a meta-feature referred to as "concept variation," that measures the amount of concept variation or the degree of lack of structure of a concept. Generally, concept variation measures the probability that any two neighbor examples differ in class value. Thus, the concept variation meta-feature quantifies the amount of irregularity in the class-label distribution. The present invention extends previous work by allowing for numeric and categorical features in addition to conventional Boolean features, and estimates the variation of the whole example population through a training sample.

In another implementation, the data classification system 100 utilizes a meta-feature referred to as the "average weighted distance," that measures the density of the distribution in the training set. For example, if a training set comprises only two examples having different class labels, then concept variation is high, independent of the distance between these two examples. The average weighted distance, however, can distinguish between examples that are too far apart or too close from each other.

The data classification system 100 can use the concept variation or average weighted distance meta-features, or both, as well as additional well-known meta-features to fully discriminate learning performance. The data classification system 100 may be embodied as a conventional data classification system, such as the learning program described in J. R. Quinlan, C4.5: Programs for Machine Learning. Morgan Kaufmann Publishers, Inc. Palo Alto, Calif., incorporated by reference herein, as modified in accordance with the features and functions of the present invention to provide meta-learning and improved meta-features.

FIG. 1 is a schematic block diagram showing the architecture of an illustrative data classification system 100 in accordance with the present invention. The data classification system 100 may be embodied as a general purpose computing system, such as the general purpose computing system shown in FIG. 1. The data classification system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute. As shown in FIG. 1, the data classification system 100 optionally includes a connection to a computer network (not shown).

As shown in FIG. 1 and discussed further below in conjunction with FIGS. 3 and 4, the data storage device 120 preferably includes a target domain database 300 and a performance table 400. Generally, the target domain database 300 contains a record for each object and indicates the class associated with each object. The performance table 400 indicates the learning algorithm that produced the best model for each domain.

In addition, as discussed further below in conjunction with FIGS. 5 through 9, the data storage device 120 includes a meta-feature generation process 500, a performance table generation process 600, a meta-learning model selection process 700, a selection process 800 and a meta-rules generation process 900. Generally, the meta-feature generation process 500 processes each domain dataset to represent the domain as a set of meta-features. Generally, the performance table generation process 600 identifies the best model for each domain dataset described by a set of meta-features and stores the results in the performance table 400. The meta-learning model selection process 700 attempts to look for correlations among the meta-features to generate rules that show when to assign a specific model to a certain domain. The selection process 800 identifies the best matching rule to assign a model to a new domain. The meta-rules generation process 900 looks for correlations between meta-features and models to determine when a model is best for a specific domain dataset.

Figure 2:
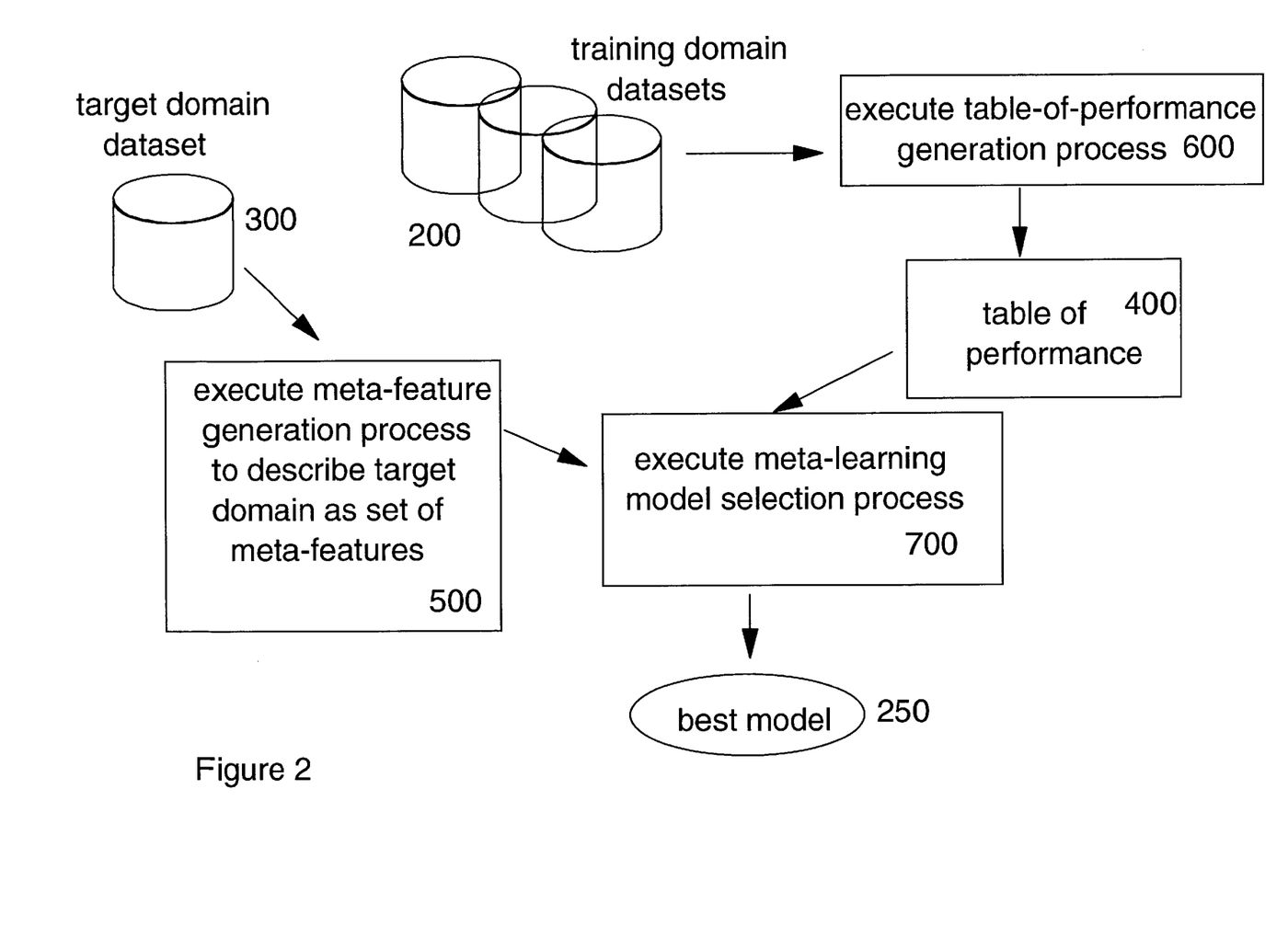
FIG. 2 illustrates the operation of the data classification system.

FIG. 2 provides a global view of the data classification system 100. As shown in FIG. 2, the data classification system 100 initially learns to associate training domain datasets 200 with learning algorithms. The goal of this first step is to identify the algorithm(s) that generate the best hypothesis or model 250 for each domain. To that end, the performance table generation process 600, discussed further below in conjunction with FIG. 6, uses the set of training domain datasets 200 to produce a performance table 400, discussed below in conjunction with FIG. 4. As previously indicated, the performance table 400 indicates for each domain, the learning algorithm that produced the best model 250.

Once the training phase is complete, a new target domain database 300 (FIG. 3) is received by the data classification system 100. The present invention selects the best model 250 for the domain dataset 300. Generally, the present invention uses the knowledge stored in the performance table 400 to select the best model 250. As shown in FIG. 2 and discussed further below in conjunction with FIG. 5, the meta-feature generation process 500 transforms the description of the target domain dataset 300 into a set of meta-features. A meta-learning model selection process 700 takes the new representation of the target domain dataset and, using the information provided by the performance table 400, determines the best model 250.

Figure 3:
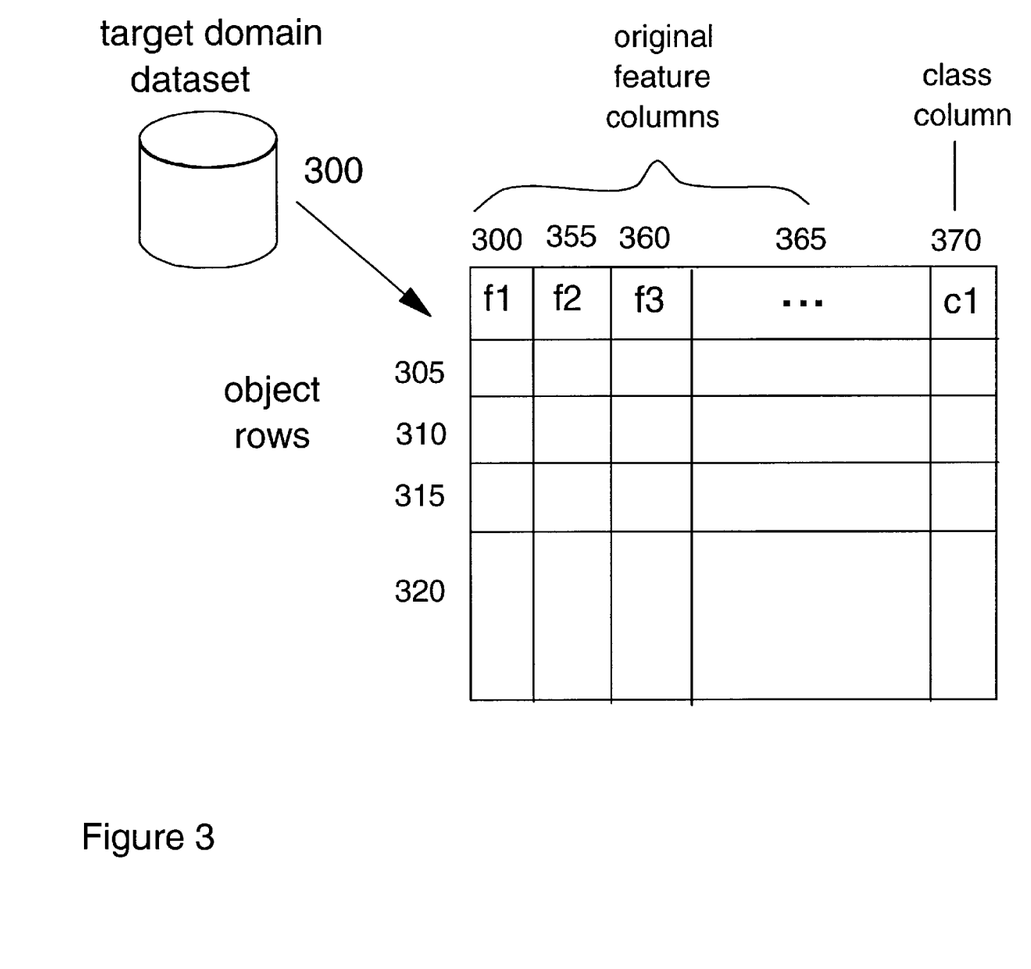
FIG. 3 illustrates an exemplary table from the target domain database of FIG. 1.

FIG. 3 illustrates an exemplary table from the target domain database 300. As previously indicated, the target domain database 300 contains a record for each object and indicates the class associated with each object. The target domain database 300 maintains a plurality of records, such as records 305 through 320, each associated with a different object. For each object, the target domain database 300 indicates a number of features in fields 350 through 365, describing each object in the dataset. The last field 370 corresponds to the class assigned to each object. For example, if the domain dataset 300 were to correspond to astronomical images to be classified as either stars or galaxies, then each record 305–320 would correspond to a different object in the image, and each field 350–365 would correspond to a different feature such as the amount of luminosity, shape or size. The class field 370 would be populated with the label of "star" or "galaxy."

Figure 4:
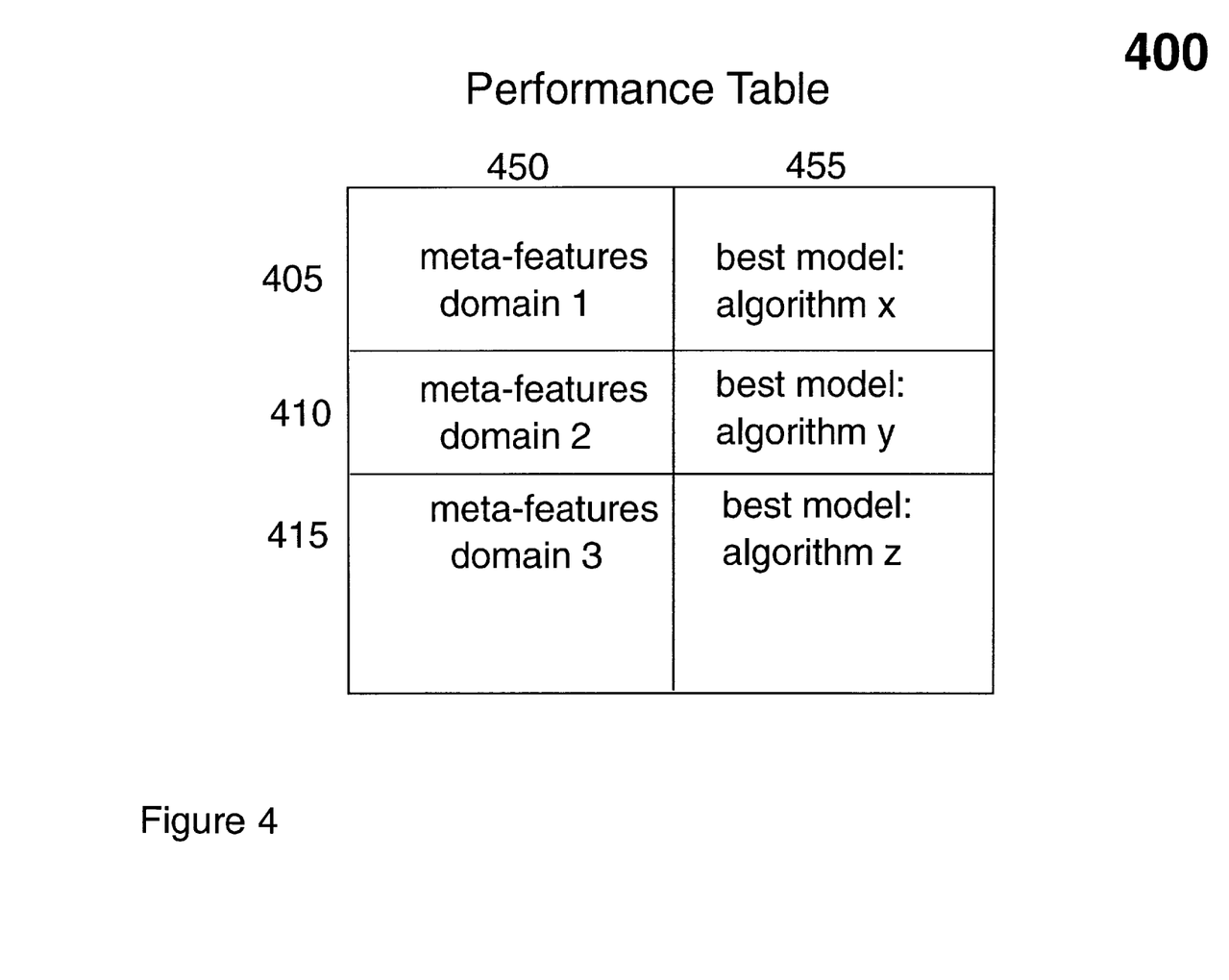
FIG. 4 illustrates an exemplary table from the performance table of FIG. 1.

FIG. 4 illustrates an exemplary table from the performance table 400. As previously indicated, the performance table 400 contains a record for each domain and indicates the learning algorithm that produced the best model for each domain. The performance table 400 maintains a plurality of records, such as records 405 through 415, each associated with a different domain. For each domain identified in field 450, the performance table 400 indicates the learning algorithm that produced the best model in field 455. In other words, each record of the performance table 400 corresponds to a different training domain datasets 200. Each domain can be identified in field 450, for example, using a vector of meta-features characterizing each domain.

Meta-features

Figure 5:
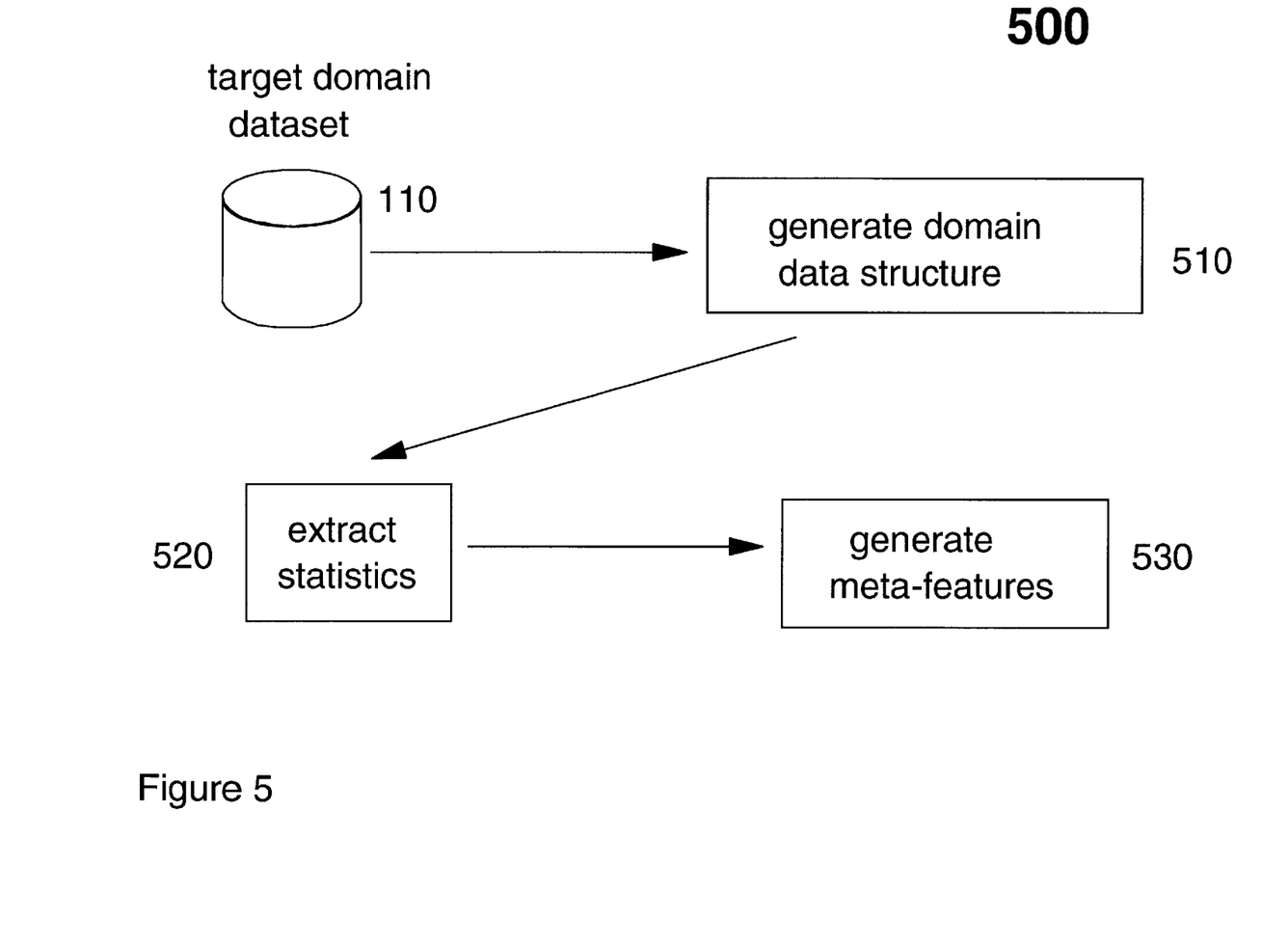
FIG. 5 is a flow chart describing the meta-feature generation process of FIG. 1.

FIG. 5 is a flow chart describing the meta-feature generation process 500. As previously indicated, the meta-feature generation process 500 processes each set of domain data to represent the domain as a set of meta-features. As shown in FIG. 5, the meta-feature generation process 500 initially processes the target domain database 300 during step 510 to store the information in a table. Thereafter, the meta-feature generation process 500 extracts statistics from the dataset 300 during step 520 that are then used to generate meta-features during step 530. It is noted that the meta-features generated during step 530 must be relevant to the meta-learning phase. As previously indicated, the data classification system 100 uses the concept variation or average weighted distance meta-features, or both, as well as additional well-known meta-features to fully discriminate learning performance.

Concept Variation

As previously indicated, the "concept variation" meta-feature measures the amount of concept variation or the degree of lack of structure of a concept. The degree of structure of a concept C can be estimated by measuring the amount of uniformity of the distribution of class labels throughout the feature space. A highly irregular space is characterized by many small disjuncts, often in need for long concept representations. In contrast, a uniform space comprises large regions of examples sharing similar class labels, potentially allowing for compact concept descriptions.

The degree of lack of structure has been estimated through a measure known as concept variation, $\nabla$. See, L. A. Rendell & R. Seshu, Learning hard concepts through constructive induction: Framework and rationale. Computational Intelligence, 6, pp. 247–270, 1990; E. Perez & L. A. Rendell, Learning despite concept variation by finding structure in attribute-based data. In Proceedings of the Thirteenth International Conference on Machine Learning, pp. 391–399, 1996 incorporated by reference herein. $\nabla$ estimates the probability that any two neighbor examples differ in class value, roughly measuring the amount of irregularity in the classlabel distribution. The conventional definition of $\nabla$ works only in boolean spaces, and assumes all examples in the space are available. It is noted that the training set $T_{train}$ (200) is made up of examples, $T_{train}: \{(X_i, c_i)\}^m_{i=1}$, where each vector $X_i$ is characterized as a point in an n-dimensional feature space, i.e., is described by n features $<c^1_i, c^2_i, \ldots, c^n_i>$ and labeled with a specific class $c_i$ (e.g., +,−) according to an unknown target function C. Let $X_1, X_2, \ldots, X_n$, be the n closest neighbors—at Hamming distance one—of an example $X_i$ in an n-dimensional boolean space. Let the amount of concept variation for example $X_i$, $F(X_i)$, be defined as $$\sigma(X_i) = \frac{1}{n} \times \sum_{j=1}^{n} \delta(C(X_i), C(X_j)), \quad (1)$$

where $\delta(C(X_i, X_j))=1$ if $C(X_i) \neq C(X_j)$ and 0 otherwise. Concept variation is defined as the average of this factor when applied to every example in the feature space:

$$\nabla = \frac{1}{2^n} \times \sum_{i=1}^{2^n} \sigma(X_i) \in \{0, 1\}. \quad (2)$$

The applicability of $\nabla$ is limited to artificial domains where all possible examples can be generated. Perez and Rendell (1996), referenced above, shows how concepts with high $\nabla$ are difficult to learn by most conventional inductive algorithms.

Improved Concept Variation

The present invention recognizes that real-world domains can be characterized based on a more general definition of concept variation. $\nabla$ will be replaced by $\nabla'$ by considering nominal and numeric features, and by using only a limited sample of examples.

The definition of $\nabla$ (Equation 2) assumes access to the closest neighbors of a given example. In real-world domains, however, that assumption no longer holds. Thus, a distance metric will be used to determine the contribution of each example to the amount of concept variation. Formally, let $X_i = <x^1_j, x^2_j, \ldots, x^n_i>$ and $X_j = <x^1_j, x^2_j, \ldots, x^n_j>$ be any two examples in training set $T_{train}$. Let the distance between these two examples be defined as:

$$D(X_i, X_j) = \sqrt{\sum_{k=1}^{n} d(x_i^k, x_j^k)^2}, \tag{3}$$

For numeric features, $d(x^k_i, x^k_j)$ is defined as $$d(x_i^k, x_j^k) = \begin{cases} 1 & \text{if } x_i^k \neq x_j^k \\ 0 & \text{if } x_i^k = x_j^k \end{cases}, \tag{4}$$

For numeric features, $d(x^k_i, x^k_j)$ is defined as $$d(x_i^k, x_j^k) = \frac{|x_i^k - x_j^k|}{MAX(x^k) - MIN(x^k)}, \tag{5}$$

where $MAX(x^k)$ and $MIN(x^k)$ are the maximum and minimum values observed for attribute k in $T_{train}$.

Now, if examples $X_i$ and $X_j$ differ in class value, i.e., $C(X_i) \neq C(X_j)$, the contribution to the amount of concept variation will depend on their distance; the closer the examples, the higher the contribution. The following function will be used to weight such contribution:

$$W(X_i, X_j) = \frac{1}{2^{ax\frac{D(X_i, X_j)}{\sqrt{n} - D(X_i, X_j)}}} \in \{0, 1\}, \tag{6}$$

where a is user defined and modulates the effect of distance: the higher a the less contribution is given as the distance between the examples grows larger. Here, the default value for a is two. A value of a =1 over-weighted examples lying far apart, while the opposite occurred for a >2; the form of $W(X_i, X_j)$ is subject of ongoing study. The term at the right of a forces $W(X_i, X_j)$ to reach the upper bound of one if $D(X_i, X_j) = 0$; the lower bound of zero is reached when $D(X_i, X_j) = \sqrt{n}$, corresponding to the maximum distance between two examples in an n-dimensional feature space.

Let the amount of concept variation for a single example $X_i$ be defined as $$\sigma'(X_i) = \frac{\sum_{j=1, j \neq i}^{m} W(X_i, X_j) \times \delta(C(X_i), C(X_j))}{\sum_{j=1, j \neq i}^{m} W(X_i, X_j)}, \tag{7}$$

where $m = |T_{train}|$ and again $\delta(C(X_i), C(X_j)) = 1$ if $C(X_i) \neq C(X_j)$ and 0 otherwise. The new measure for concept variation, $\nabla'$, is defined as the average of this factor over all training examples:

$$\nabla' = \frac{1}{m} \times \sum_{i=1}^{m} \sigma'(X_i) \in \{0, 1\}, \tag{8}$$

Average Weighted Distance

While $\nabla'$ estimates the variability of class labels among examples, it fails to capture how dense or sparse is the example distribution in the training set. For example, if a training set comprises only two examples having different class labels, then $\nabla' = 1$, independently of the distance between these two examples.

Given an example $X_i$, the average weighted distance between $X_i$ and all other examples in the training set T train, is defined as $$v(X_i) = \frac{\sum_{j=1, j \neq i}^{m} W(X_i, X_j) \times D(X_i, X_j)}{\sum_{j=1, j \neq i}^{m} W(X_i, X_j)}, \tag{9}$$

The average weighted distance between examples, $\gamma$, is defined as the average of this factor over all training examples:

$$\gamma = \frac{1}{m} \times \sum_{i=1}^{m} v(X_i) \in \{0, 1\}. \tag{10}$$

Figure 6:
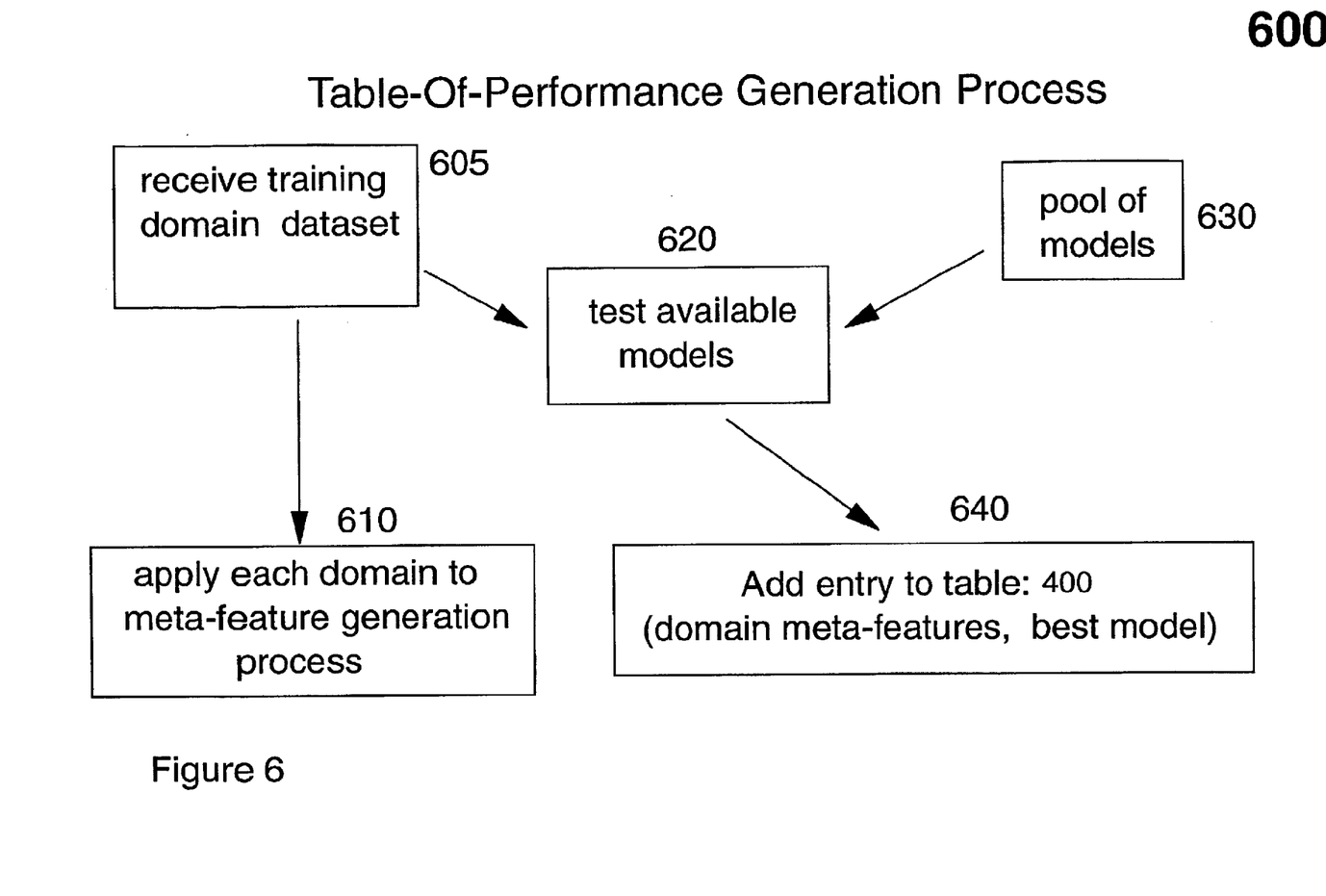
FIG. 6 is a flow chart describing the performance table generation process of FIG. 1.

FIG. 6 is a flow chart describing the performance table generation process 600. The performance table generation process 600 identifies the best model for each domain dataset described by a set of meta-features. The process 600 initially receives a set of training domain datasets 200, with each domain represented by a set of meta-features, during step 605. Each domain in the training domain datasets 200 is applied to the meta-feature generation process 500 during step 610. The performance table generation process 600 tests each model during step 620 from a pool of available models 630 to determine which model has empirically the best performance for each training domain dataset 200. For a detailed discussion of suitable models 630, see, for example, J. R. Quinlan, C4.5: Programs for Machine Learning. Morgan Kaufmann Publishers, Inc. Palo Alto, Calif. (1994) (decision trees); Weiss, Sholom and Indurkhya, Nitin, "Optimized Rule Induction", Intelligent Expert, Volume 8, Number 6, pp. 61–69, 1993 (rules); and L. R. Rivest, "Learning Decision Lists", Machine Learning, 2, 3, 229–246, (1987) (decision lists), each incorporated by reference herein.

The performance table generation process 600 produces the performance table 400 during step 640. In one illustrative embodiment, the generated performance table 400 includes a number of entries where each entry is a pair (AB), where A is a vector of meta-features and B is the best model for that domain.

Figure 7:
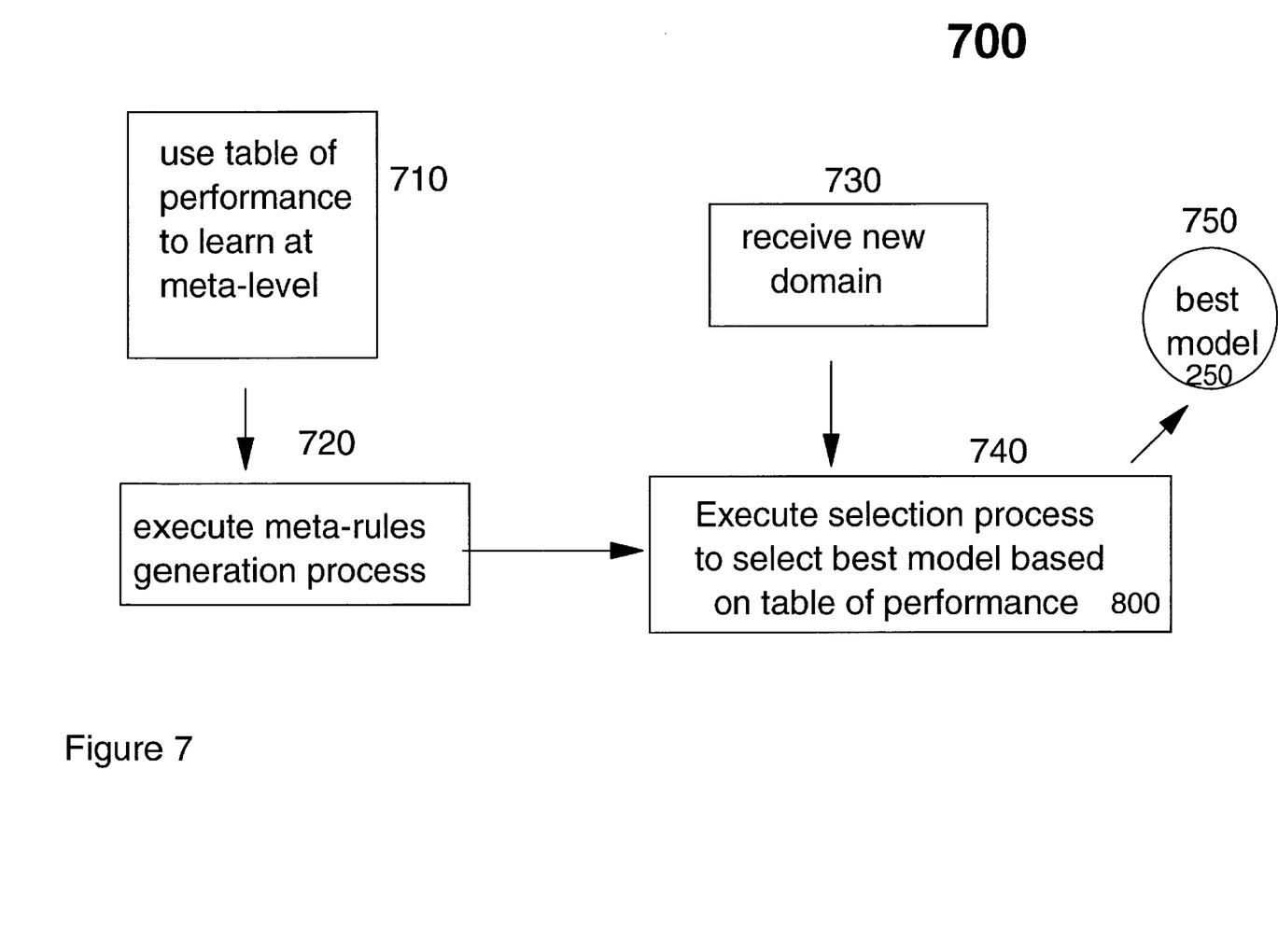
FIG. 7 is a flow chart describing the meta-learning model selection process of FIG. 1.

FIG. 7 is a flow chart describing the meta-learning model selection process 700 that attempts to look for correlations among the meta-features to generate rules that show when to assign a specific model to a certain domain. As shown in FIG. 7, the meta-learning model selection process 700 initially processes the performance table 400 during step 710 to learn at the meta-level and produce a set of meta-rules during step 720. The rules are referred to as meta-rules because learning is taking place at the meta-level. The creation of meta-rules is discussed further below in conjunction with FIG. 9. Generally, the meta-rules generation process 900 (FIG. 9) evaluates the meta-feature description of each domain, as well as the corresponding "best model" indicated in the table of performance 400, and attempts to define (in the form of meta-rules) domain characteristics for which certain models perform best.

Figure 8:
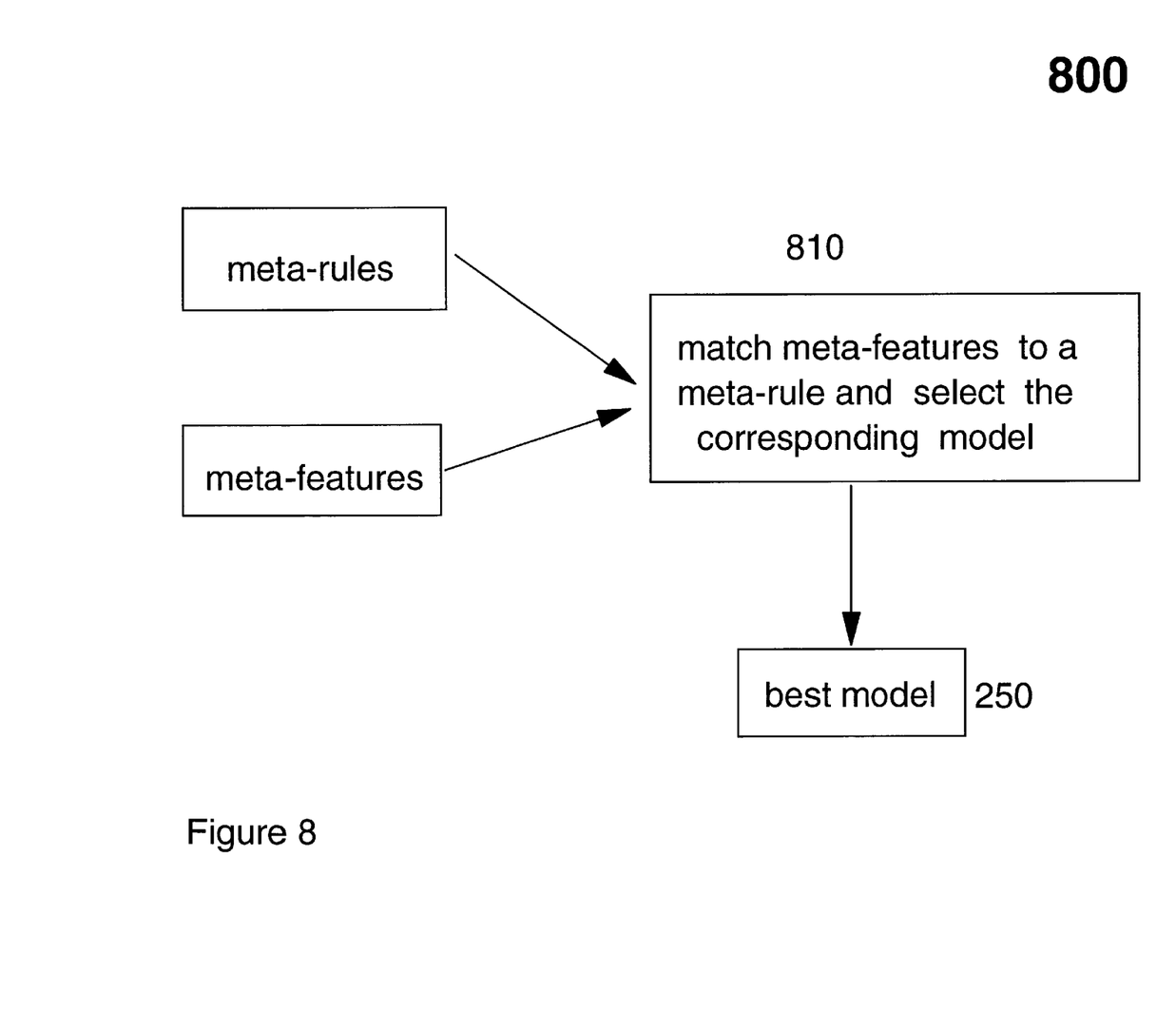
FIG. 8 is a flow chart describing the selection process of FIG. 1.

When a new domain is received during step 730, represented by a vector of meta-features in accordance with the present invention, the selection process 800, discussed below in conjunction with FIG. 8, is initiated during step 740 to identify the best matching rule to assign a model 250 to the new domain. The meta-learning model selection process 700 generates an indication of the model 250 that is expected to perform well for that domain during step 750.

FIG. 8 is a flow chart describing the selection process 800. As previously indicated, the selection process 800 is executed by the meta-learning model selection process 700 to identify the best matching rule to assign a model 250 to a new domain. As shown in FIG. 8, the selection process 800 receives a set of meta-rules (created by the meta-learning model selection process 700 during step 720 ) and a set of meta-features corresponding to the target domain dataset 300 in accordance with the present invention.

The selection process 800 matches the meta-feature description of the domain to the meta-rules during step 810 to determine the best model 250 for the domain. In other words, the meta-rules are applied to the meta-feature description of the domain to determine if any meta-rules are satisfied, thereby indicating one or more potential models to utilize to classify the domain. A conflict-resolution strategy may take place if several rules fire at the same time. The end result is a model 250 that can be used for the prediction of new objects in the target domain dataset 300.

Figure 9:
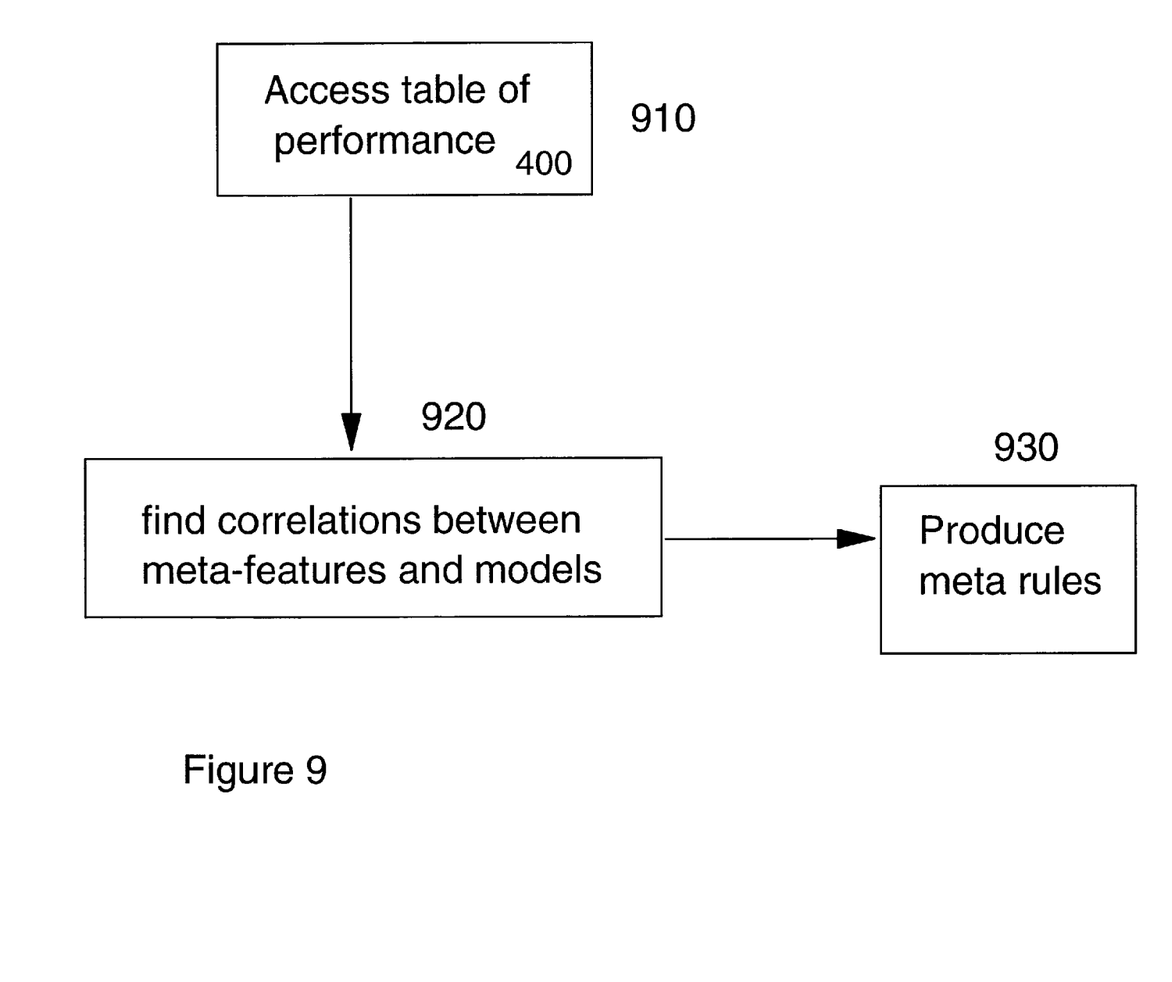
FIG. 9 is a flow chart describing the meta-rules generation process shown in FIG. 1.

FIG. 9 is a flow chart describing the meta-rules generation process 900. As indicated above, the meta-rules generation process 900 (FIG. 9) evaluates the meta-feature description of each domain, as well as the corresponding "best model" indicated in the table of performance 400, and attempts to define (in the form of meta-rules) domain characteristics for which certain models perform best. The meta-rules generation process 900 accesses the performance table 400 during step 910, and then looks for correlations between meta-features and models to determine when a model is best for a specific domain dataset during step 920. This is learning at the meta-level space, which we consider key for the success of a model selection strategy. Unless one is able to distinguish when an algorithm works well and when not, model selection is prone to failure. The use of meta-learning knowledge in terms of meta-features helps to identify the domains of expertise for each learning algorithm. The meta-rules generation process 900 produces a set of meta-rules during step 930.

It is to be understood that the embodiments and variations shown and described herein are merely illustrative of the principles of this invention and that various modifications may be implemented by those skilled in the art without departing from the scope and spirit of the invention.

What is claimed is:

1. A method for classifying data, comprising the steps of:
representing at least one domain dataset using a set of meta-features, wherein said meta-features includes a concept variation meta-feature;
evaluating the performance of a plurality of learning algorithms on said at least one domain dataset;
identifying at least one of said learning algorithms having a performance that exceeds predefined criteria for said at least one domain dataset;
identifying a learning algorithm to classify a new dataset described using a set of meta-features.

2. The method of claim 1, wherein said concept variation meta-feature estimates the variation of the whole example population through a training sample.

3. The method of claim 1, wherein said concept variation meta-feature includes numeric features.

4. The method of claim 1, wherein said concept variation meta-feature includes categorical features.

5. The method of claim 1, wherein said concept variation meta-feature includes boolean features.

6. The method of claim 1, wherein said predefined criteria selects a learning algorithm that performs best for said domain dataset.

7. The method of claim 1, wherein said identifying step further comprises the step of identifying a model in accordance with said identified learning algorithm.

8. The method of claim 1, wherein said concept variation meta-feature utilizes a distance metric to determine the contribution of each example to the amount of concept variation.

9. A method for classifying data, comprising the steps of:
representing at least one domain dataset using a set of meta-features, wherein said meta-features includes an average weighted distance meta-feature that measures the density of the distribution of said at least one domain dataset;
evaluating the performance of a plurality of learning algorithms on said at least one domain dataset;
identifying at least one of said learning algorithms having a performance that exceeds predefined criteria for said at least one domain dataset;
identifying a learning algorithm to classify a new dataset described using a set of meta-features.

10. The method of claim 9, wherein said predefined criteria selects a learning algorithm that performs best for said domain dataset.

11. The method of claim 9, wherein said identifying step further comprises the step of identifying a model in accordance with said identified learning algorithm.

12. A system for classifying data, comprising:
a memory that stores computer-readable code; and
a processor operatively coupled to said memory, said processor configured to implement said computer-readable code, said computer-readable code configured to:
represent at least one domain dataset using a set of meta-features, wherein said meta-features includes a concept variation meta-feature;
evaluate the performance of a plurality of learning algorithms on said at least one domain dataset;
identify at least one of said learning algorithms having a performance that exceeds predefined criteria for said at least one domain dataset;
identify a learning algorithm to classify a new dataset described using a set of meta-features.

13. The system of claim 12, wherein said concept variation meta-feature estimates the variation of the whole example population through a training sample.

14. The system of claim 12, wherein said concept variation meta-feature includes numeric features.

15. The system of claim 12, wherein said concept variation meta-feature includes categorical features.

16. The system of claim 12, wherein said concept variation meta-feature includes boolean features.

17. The system of claim 12, wherein said predefined criteria selects a learning algorithm that performs best for said domain dataset.

18. The system of claim 12, wherein said identifying step further comprises the step of identifying a model in accordance with said identified learning algorithm.

19. The system of claim 12, wherein said concept variation meta-feature utilizes a distance metric to determine the contribution of each example to the amount of concept variation.

20. A system for classifying data, comprising:

a memory that stores computer-readable code; and a processor operatively coupled to said memory, said processor configured to implement said computer-readable code, said computer-readable code configured to:

represent at least one domain dataset using a set of meta-features, wherein said meta-features includes an average weighted distance meta-feature that measures the density of the distribution of said at least one domain dataset;

evaluate the performance of a plurality of learning algorithms on said at least one domain dataset;

identify at least one of said learning algorithms having a performance that exceeds predefined criteria for said at least one domain dataset;

identify a learning algorithm to classify a new dataset described using a set of meta-features.

21. The system of claim 20, wherein said predefined criteria selects a learning algorithm that performs best for said domain dataset.

22. The system of claim 20, wherein said identifying step further comprises the step of identifying a model in accordance with said identified learning algorithm.

23. An article of manufacture, comprising:

a computer readable medium having computer readable code means embodied thereon, said computer readable program code means comprising:

a step to represent at least one domain dataset using a set of meta-features, wherein said meta-features includes a concept variation meta-feature;

a step to evaluate the performance of a plurality of learning algorithms on said at least one domain dataset;

a step to identify at least one of said learning algorithms having a performance that exceeds predefined criteria for said at least one domain dataset;

a step to identify a learning algorithm to classify a new dataset described using a set of meta-features.

24. An article of manufacture, comprising:

a computer readable medium having computer readable code means embodied thereon, said computer readable program code means comprising:

a step to represent at least one domain dataset using a set of meta-features, wherein said meta-features includes an average weighted distance meta-feature that measures the density of the distribution of said at least one domain dataset;

a step to evaluate the performance of a plurality of learning algorithms on said at least one domain dataset;

a step to identify at least one of said learning algorithms having a performance that exceeds predefined criteria for said at least one domain dataset;

a step to identify a learning algorithm to classify a new dataset described using a set of meta-features.

* * * * *

UNITED STATES PATENT AND TRADEMARK OFFICE
CERTIFICATE OF CORRECTION

PATENT NO. : 6,842,751 B1
DATED : January 11, 2005
INVENTOR(S) : Vilalta et al.

It is certified that error appears in the above-identified patent and that said Letters Patent is hereby corrected as shown below:

Title page,
Item [56], References Cited, OTHER PUBLICATIONS, insert the following references:
-- Breiman., "Bagging Predictors," Machine Learning, 23, 123-140 (1996).
Gama et al., "Characterization of Classification Algorithms," In C Pinto-Ferreira and N. Mamede (eds.) Progress in Artificial Intelligence, 189-200 (1995).
Perez et al., "Learning Despite Concept Variation by Finding Structure in Attribute-Based Data," International Conference on Machine Learning (1996).
Thrun et al., "Learning One More Thing," Proc. of ISCA Montreal (1995). --.

Column 7,
Line 14, before "be any" and after "and" replace " $X_{j=<x_j^1}, x_j^2, \ldots, x_j^n >$ " with
-- $X_j = <x_j^1, x_j^2, \ldots, x_j^n >$ --.

Lines 60-64, replace " $\sigma'(X_i) = \dfrac{\sum_{j=1, j \neq i}^{m} W(X_i, X_j) \times \delta(C(X_j))}{\sum_{j=1, j \neq i}^{m} W(X_i, X_j)}$ " with -- $\sigma'(X_i) = \dfrac{\sum_{j=1, j \neq i}^{m} W(X_i, X_j) \times \delta(C(X_i), C(X_j))}{\sum_{j=1, j \neq i}^{m} W(X_i, X_j)}$ --.

Column 8,
Lines 19-23, replace " $v(X_i) = \dfrac{\sum_{j=1, j \neq i}^{m} W(X_i, X_j) \times D(X_i, X_j)}{\sum_{j=1, j \neq i}^{m} W(X_i, X_j)}$ " with -- $v(X_i) = \dfrac{\sum_{j=1, j \neq i}^{m} W(X_i, X_j) \times D(X_i, X_j)}{\sum_{j=1, j \neq i}^{m} W(X_i, X_j)}$ --.

Column 9,
Line 59, before "method" and after "A" insert -- computer-implemented --.
Line 67, after "dataset:" insert -- and --.

UNITED STATES PATENT AND TRADEMARK OFFICE
CERTIFICATE OF CORRECTION

PATENT NO. : 6,842,751 B1
DATED : January 11, 2005
INVENTOR(S) : Vilalta et al.

It is certified that error appears in the above-identified patent and that said Letters Patent is hereby corrected as shown below:

Column 10,
Line 22, before "method" and after "A" insert -- computer-implemented --.
Lines 32 and 55, after "dataset:" insert -- and --.

Column 11,
Line 27, after "dataset:" insert -- and --.

Column 12,
Lines 13 and 30, after "dataset:" insert -- and --.

Signed and Sealed this

Eighteenth Day of October, 2005

JON W. DUDAS
*Director of the United States Patent and Trademark Office*